US009805058B2

(12) United States Patent
Hong et al.

(10) Patent No.: US 9,805,058 B2
(45) Date of Patent: Oct. 31, 2017

(54) VISIBILITY OF A POINT OF INTEREST BASED ON ENVIRONMENTAL CONDITIONS

(71) Applicant: Microsoft Corporation, Redmond, WA (US)

(72) Inventors: Zhiqing Hong, Bothell, WA (US); Siddhartha Arora, Redmond, WA (US); Vasily Kiritsev, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 265 days.

(21) Appl. No.: 14/292,917

(22) Filed: Jun. 1, 2014

(65) Prior Publication Data

US 2015/0347458 A1   Dec. 3, 2015

(51) Int. Cl.
  *G06F 17/30* (2006.01)
  *G01C 21/32* (2006.01)
  *G01C 21/36* (2006.01)

(52) U.S. Cl.
  CPC ....... *G06F 17/30241* (2013.01); *G01C 21/32* (2013.01); *G01C 21/3679* (2013.01); *G06F 17/30424* (2013.01); *G06F 17/30554* (2013.01)

(58) Field of Classification Search
  CPC combination set(s) only.
  See application file for complete search history.

(56) References Cited

U.S. PATENT DOCUMENTS

| 6,018,699 | A | 1/2000 | Baron, Sr. et al. |
| 7,089,116 | B2 | 8/2006 | Smith |
| 7,129,857 | B1 * | 10/2006 | Spirkovska ............. G01W 1/00 340/971 |
| 7,181,345 | B2 | 2/2007 | Rosenfeld et al. |
| 7,403,856 | B2 * | 7/2008 | Moscovitz ........... G01C 21/005 702/5 |

(Continued)

FOREIGN PATENT DOCUMENTS

EP   1435507 A2   7/2004

OTHER PUBLICATIONS

"International Search Report and Written Opinion Issued in PCT Application No. PCT/US2015/033100", Dated Aug. 20, 2015, 11 Pages.

(Continued)

*Primary Examiner* — Etienne Leroux (57) ABSTRACT

Architecture having an algorithm that computes visible structures for a user within a distance defined by one or more environmental conditions. An environmental condition such as reduced visibility due to a weather condition such as rain, fog, etc., can be used to define a radius about the user in which possible points of interest (POIs) can be identified as viewable based on current weather visibility data. The altitude of the user is considered when identifying the possible POIs. The user is more likely capable of viewing other structures as POIs when the user is at a higher altitude. If the user is known to be standing on a ridge overlooking a city, this information can be processed by the algorithm to then show more POIs relative to this elevated user location than if the user was at approximately zero altitude. A sight map is generated based on these considerations.

20 Claims, 7 Drawing Sheets

(56) References Cited

U.S. PATENT DOCUMENTS

| | | | |
|---|---|---|---|
| 8,594,706 B1 | 11/2013 | Heinen | |
| 2003/0197867 A1* | 10/2003 | Kwon | G01N 21/59 356/437 |
| 2008/0137911 A1* | 6/2008 | Hautiere | G01N 21/538 382/106 |
| 2010/0017129 A1* | 1/2010 | Wilcox | G01W 1/10 702/3 |
| 2012/0035898 A1 | 2/2012 | Repelli et al. | |
| 2013/0212094 A1* | 8/2013 | Naguib | G01C 21/206 707/730 |
| 2014/0071119 A1* | 3/2014 | Piemonte | G06T 17/05 345/419 |

OTHER PUBLICATIONS

"Second Written Opinion Issued in PCT Application No. PCT/US2015/033100", Dated Mar. 16, 2016, 6 Pages.

"Location and Maps Programming Guide", Published on: Nov. 9, 2013, Available at: https://developer.apple.com/library/ios/documentation/userexperience/conceptual/LocationAwarenessPG/LocationAwarenessPG.pdf, pp. 1-79.

"GP View3shed Task", retrieved Jan. 8, 2014; available at: http://developers.arcgis.com/en/javascript/samples/gp_viewshed/, 1 page.

"International Preliminary Report on Patentability Issued in PCT Application No. PCT/US2015/033100", Dated Jul. 15, 2016, 8 Pages.

\* cited by examiner

VISIBILITY OF A POINT OF INTEREST BASED ON ENVIRONMENTAL CONDITIONS

BACKGROUND

The ever-increasing sources and types of data made available on the Internet and other types of networks provide the capability to use this data in many different ways. Mapping is a popular technology used by many people to navigate to destinations, determine where they are, and to determine in greater detail the surroundings, whether natural (e.g., parks, hiking paths, mountains, etc.) or manmade (e.g., suburban areas, downtowns, business locations, etc.).

The types of information are no longer limited to two-dimensional (2D) data, but can now comprise three-dimensional (3D) data. Thus, weather maps, for example, now present 3D rendering effects of cloud movement, rain systems, fog, and so on, on device displays. Additionally, navigation maps can also consider altitude information in 3D renderings to displays to provide a more interesting user experience. However, such data can be used in additional intuitive and useful ways heretofore not yet realized.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture comprises an algorithm that computes visible structures for a user within a distance defined by one or more environmental conditions. For example, an environmental condition such as reduced visibility due to a weather condition such as rain, fog, etc., can be used to define a radius about the user in which possible points of interest (POIs) can be identified as viewable based on current weather visibility data. Additionally, the altitude of the user is taken into consideration when identifying the possible POIs. The user is more likely capable of viewing other structures as POIs when the user is at a higher altitude. For example, if the user is known to be standing on a ridge overlooking a city, this information can be processed by the algorithm to then show more POIs relative to this elevated user location than if the user was at approximately zero altitude. The resulting sight map is generated based on these considerations.

Generally, the algorithm identifies the user geographical location according to geo-coordinates, obtains/receives user altitude data, identifies the visibility distance based on the environmental conditions, generates a geometric shape (e.g., circle, polygon) around the user location where the polygon perimeter relates to the visibility distance, applies a grid of tiles over the polygon area, processes tiles of the polygon to identify viewable POIs within the visibility distance, and presents a sight map to the user of the possible viewable POIs from the user location (which includes the user elevation or altitude).

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Currently, maps are evolving from 2D (two-dimensional) maps to 3D (three-dimensional) maps, which add altitude into the mapping world. Moreover, the increasing sources of information make accessible new information about the buildings, and other structures that have a height or altitude of interest, as well as environmental conditions such as weather information.

The disclosed architecture provides an approach that assesses the quality of the view to one or more points of interest (POI) when observing from an observation point (e.g., standing at a certain geographical location and at a given elevation), and in the context of environmental conditions (defined to generally refer to all conditions that might affect a view to the POI) such as natural and weather conditions (e.g., into the sun, hills, mountains, trees, fog, rain, snow flurries, migratory patterns of bird, etc.), construction conditions (e.g., cranes, scaffolding, etc.), and other suspended particulate conditions (e.g., smog, smoke, dust, etc.). For example, the following query can now be answered: "Given today's weather, can I see Mountain Rainier if I'm sitting on top of the City Center Building in Bellevue?"

The architecture generates a sight map based on one or more of the environmental conditions (e.g., the weather conditions) in that area and for a given POI or multiple POIs (points of interest). Given this information, the architecture creates a new scenario that informs the user of things the user can see (and/or not see), at that time and from the current user location based on the environmental conditions.

Generally, the algorithm identifies the user geographical location (observation point) according to geo-coordinates (e.g., latitude and longitude) automatically determined (e.g., by geolocation systems such as GPS (global positioning system)) and/or received by direct user input, obtains/receives user altitude data at the observation point, identifies the visibility distance based on data obtained about the environmental conditions, generates a polygon (the term polygon is intended to include a circle) around the user location (observation point) where the polygon perimeter relates to the visibility distance, applies a grid of tiles over the polygon area, processes tiles of the polygon area to identify viewable POIs within the polygon area, and presents a sight map to the user of the possible viewable POIs from the user location (which includes the user elevation or altitude).

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
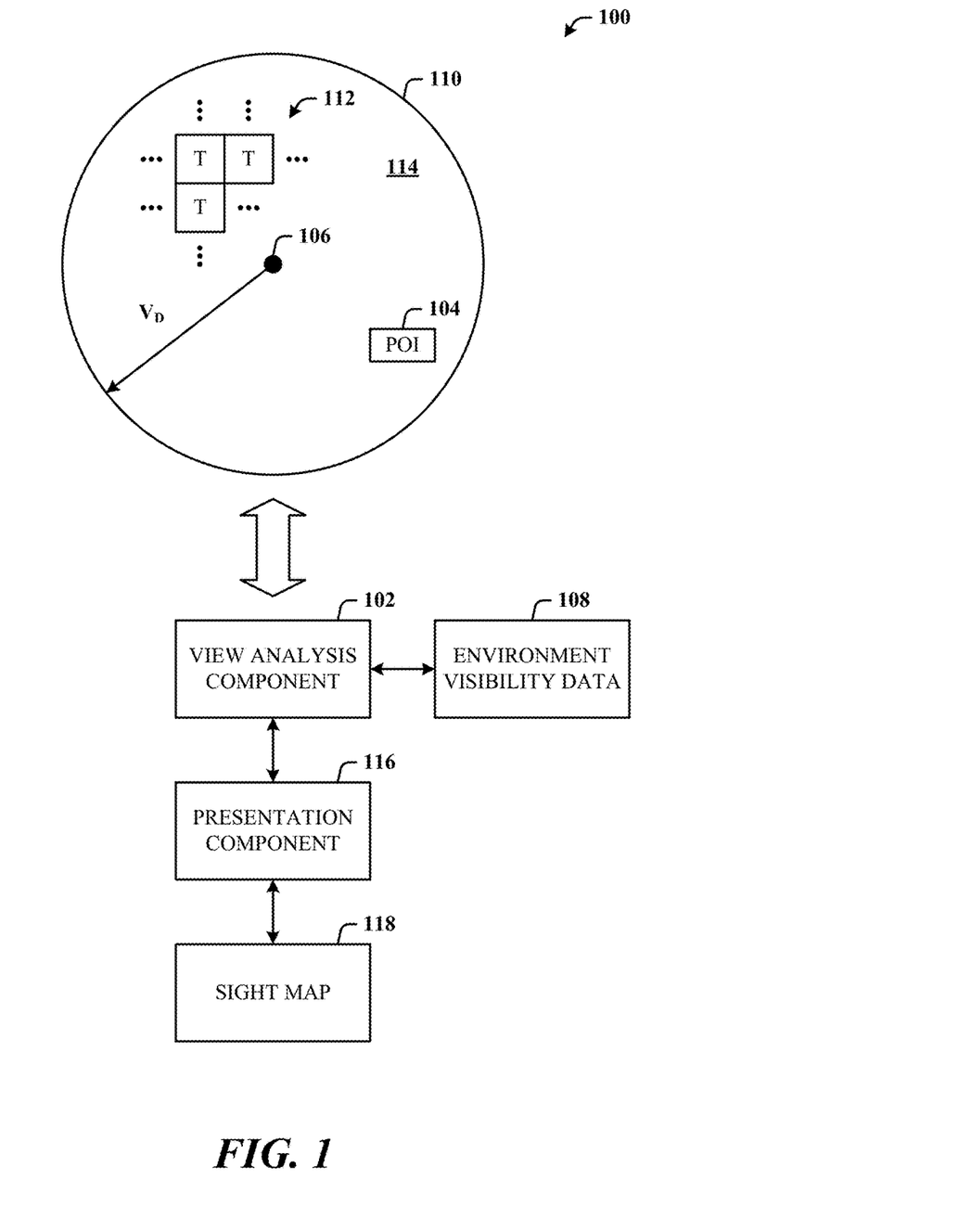
FIG. 1 illustrates a system in accordance with the disclosed architecture.

FIG. 1 illustrates a system 100 in accordance with the disclosed architecture. The system 100 can include a view analysis component 102 configured to assess visibility of a point of interest (POI) 104 relative to an observation point 106. The view analysis component 102 computes a visibility distance $V_D$ from the observation point 106 based on environmental visibility data 108 and geographical location data of the observation point 106.

The environmental visibility data can be obtained directly or be derived from information related to widespread or dispersed impediments (e.g., fog) to viewing things. Such impediments comprise natural conditions such as weather, that include but are not limited to, fog, rain, snow, wind-driven particulates such as dust, rain, smoke, snow, sleet, etc., as well as from manmade conditions and objects that typically are more focused obstacles to viewing things such as construction objects that include but are not limited to scaffolding, cranes, transports (e.g., ships, trains, etc.), and so on.

The environmental visibility data can be obtained from a single source or many different sources such as publicly accessible websites that provide such information. For example, weather visibility data can be accessed from local meteorological websites. The view analysis component 102 generates a visibility perimeter 110 relative to the observation point 106 and based on the environmental visibility data 108.

The view analysis component 102 generates tiles 112 throughout an area 114 defined by the visibility perimeter 110 and processes contributions of structures associated with the tiles 112 in the area 114. The view analysis component 102 configures tile footprint dimensions (e.g., length and width) based on accuracy and performance in processing the data and generating the sight map. In other words, where the area 114 is not as populated with structures such as buildings and other points-of-interest, the tile geometry can have a larger footprint (a lower granularity for a lower resolution) than in a downtown area where there are a greater number of possible structures and points of interest for a smaller footprint (and higher granularity for a higher resolution).

The system 100 can further comprise a presentation component 116 configured to generate a sight map 118 that presents the POI 104 relative to the observation point 106 and in the area 114.

It is to be understood that in the disclosed architecture, certain components may be rearranged, combined, omitted, and additional components may be included. Additionally, in some implementations, all or some of the components are present on the client, while in other implementations some components may reside on a server or are provided by a local or remove service.

Figure 2:
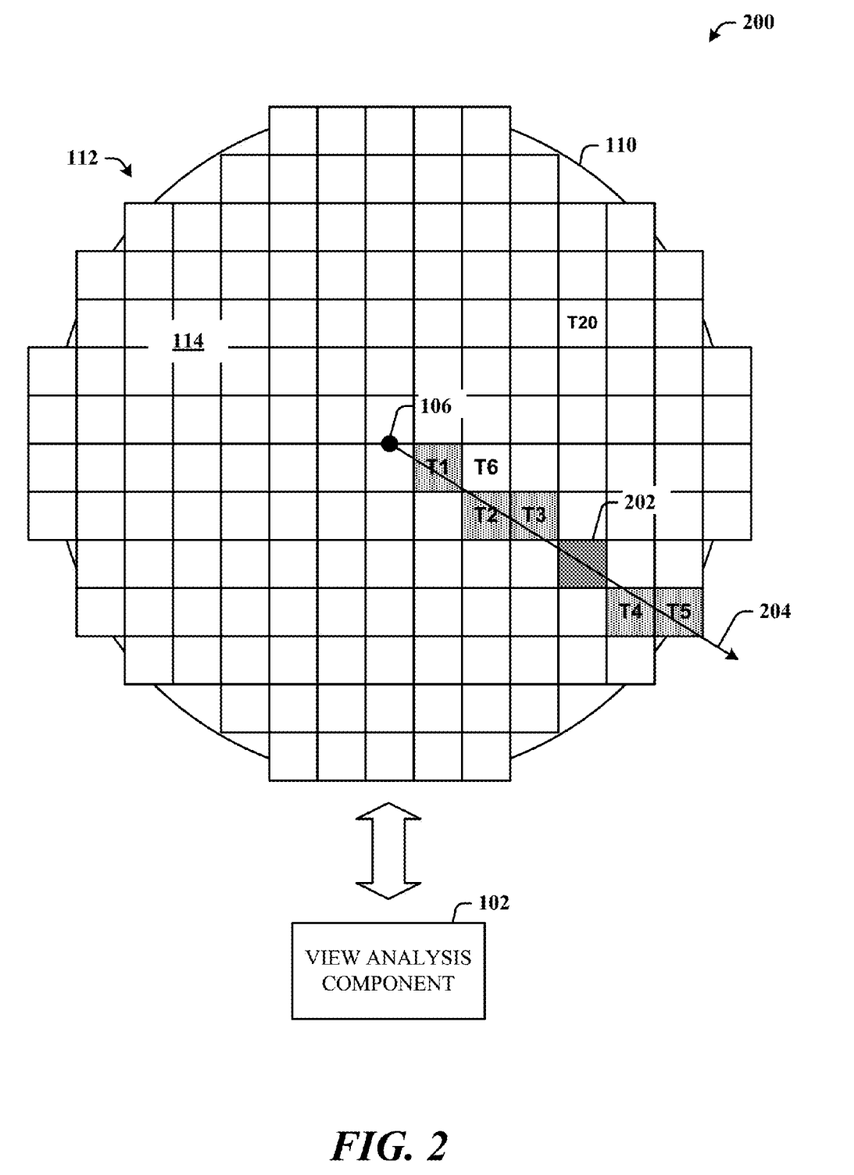
FIG. 2 illustrates the visibility perimeter of the tiles about the observation point.

FIG. 2 illustrates the visibility perimeter 110 of the tiles 112 about the observation point 106. The view analysis component 102 receives as input geolocation data (e.g., latitude/longitude, "lat/long") and environmental conditions data (e.g., weather visibility), and generates a polygon (e.g., a circle) that will be processed to find POIs the user can see from the observation point 106 and one or more environmental conditions that affect visibility (e.g., weather visibility).

An exemplary algorithm employed by the architecture to obtain the desired output can be the following using a circle as the polygon and weather visibility as the environmental visibility data.

Initially, the height or altitude (e.g., elevation at, above, or below sea level) of the surface terrain at the observation point 106 is obtained. The surface altitude data can be obtained from a database (e.g., map) that stores and makes accessible such information and/or websites that provide such information. If the user is observing from a height above the surface of the terrain (the sea level altitude) such as on the top floor of a structure such as a building (an elevated observation point), this additional altitude data is added to the surface altitude data to more closely approximate the elevated observation point in 3D space. Thus, as used herein, the "observation point 106" can mean solely the sea level height (surface altitude) or the combination of both the sea level height and a structure height (an elevated observation point), based on the user location.

A circle is drawn about the observation point 106 geolocation using the lat/long coordinates with the circle approximately centered on the coordinates (associated with the observation point 106) and the circle radius defined by weather visibility information (e.g., "a visibility of two miles in the downtown area", as may be obtained from a weather station or website would indicate a radius of two miles).

The circle is then divided into (overlayed with) a grid of tiles T (the tiles 112). The tile size (base or footprint area) can be configurable, but the same size for a given circle. The tile size can also be different for different circles (or polygons), based on a balance between accuracy and system performance. Each of the tiles 112 can have a tile height, defined as the peak (topmost point). The tile height approximates the structure height of the tallest structure (e.g., building height) for that tile area. Thus, the tile can now be a 3D object (footprint area and height).

Each tile associated with the circle is processed for visibility characteristics from the observation point 106 to that tile (denoted as a target tile when being processed) as part of ultimately generating the sight map. Generally, the algorithm walks through each tile within in the circle area 114 to assess POIs that are located therein and visible or partially visible.

A tile selected by the algorithm for visibility processing is referred to as a target tile. Once the algorithm identifies a given tile as the target tile, such as a target tile 202, a target line 204 is drawn from the observation point 106 (or circle center on the surface if the observation point 106 is elevated) through the center of the target tile 202 and extended through the circle perimeter 110. The distance from the target tile 202 to the circle center and the height of the target tile 202 are computed. Thus, the line-of-sight of the user from the observation point 106 to the peak of the target tile 202 is established.

All tiles that intersect the target line 204 are identified as "visibly connected tiles" for the given target tile 202. Additionally, the visibly connected tiles are tagged or designated as "visible" as part of tile processing. Visible tiles are tagged as visible to eliminate the processing of tiles that are not visible. Thus, for each of the tiles 112 in the circle perimeter 110: if a tile T6 is not a visible tile for the currently processed target tile 202, the non-visible tile T6 and all other non-visible tiles (e.g., T20) are skipped for the processing of the target tile 202 and the algorithm progresses to a next visible tile.

Here, there are five "visibility connected tiles" (T1-T5) related to the target tile 202: three visibly connected tiles (T1, T2, and T3) between the target tile 202 and the circle center (or vertical axis through an elevated observation point 106), and two tiles (T4 and T5) on the side of the target tile 202 opposite the observation point 106.

For each visibly connected tile along the target line 204, the straight-line surface distance from the visible tile to the circle center (which can be the same as the observation point 106, if the observation point 106 is not elevated) is derived.

If the visible tile is closer to the circle center than the target tile, the processing of these tiles is skipped (or ignored). Thus, the visible tiles T1, T2, and T3 are skipped in the processing. For the visible tiles T4 and T5 greater in distance from the circle center than the target tile 202, the shaded height is computed as from the observation point 106. If the shaded height of the target tile 202 is greater than the height of the visible tile T4, for example, the visible tile T4 is then marked invisible. If the shaded height of the target tile 202 is not greater than the visible tile T4, then both can be viewed from the observation point 106. This process applies equally to the visible tile T5. Once the processing of visible tile T5 completes, a new target tile is selected, and the processing repeated for the associated visibly connected tiles.

Thus, the view analysis component 102 processes tiles that intersect a target line for visibility. The target line is drawn in association with the observation point and a target tile. The view analysis component 102 computes tile heights of corresponding structures associated with the tiles along the target line.

Figure 3:
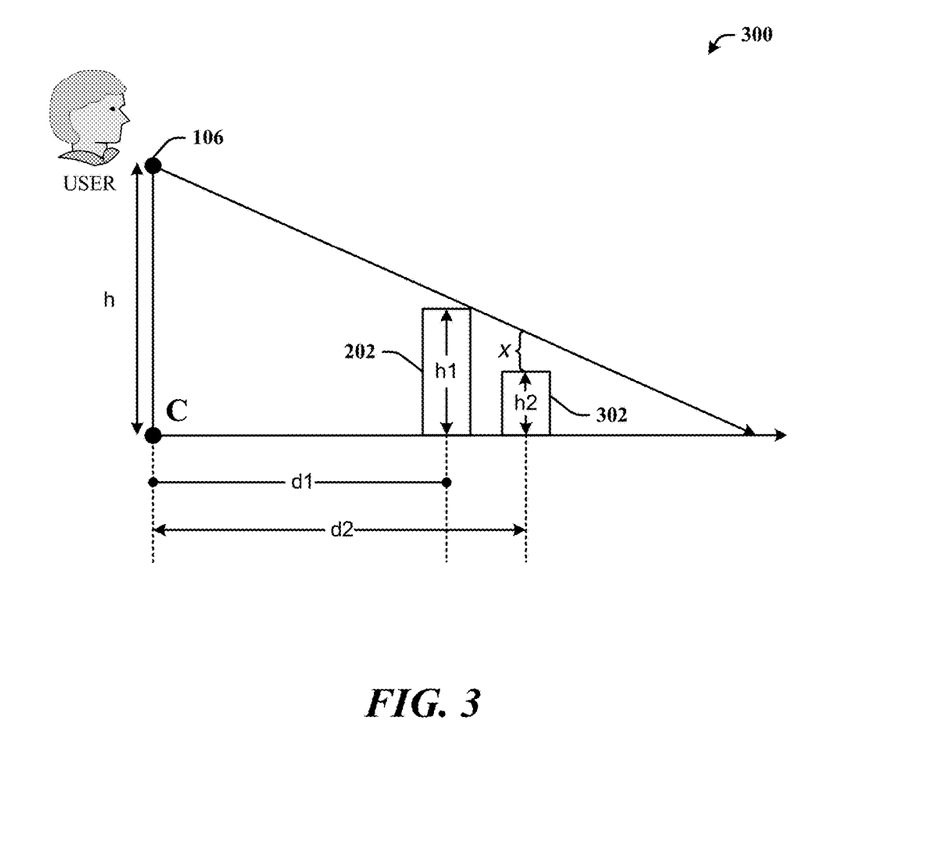
FIG. 3 illustrates computational aspects of an exemplary distance and height algorithm for the viewing of possible points of interest.

FIG. 3 illustrates computation aspects 300 of an exemplary distance and height algorithm for the viewing of possible points of interest. Generally, a target tile is selected and the associated visibly connected tiles are identified. Then each visibly connected tile is processed for visibility relative to the target tile and based on the altitude of the observation point (e.g., of a user). If a visibly connected tile is closer to the circle center C than the target tile, the visibly connected tile is changed to an invisible tail and then skipped from further processing for that target tile. On the other hand, is the target tile is closer to the circle center C than the visibly connected tile, shaded height processing is performed to determine if the visibly connected tile is actually not visible (of lesser height than the target tile), but shaded from view by the target tile as viewed from the observation point.

More specifically, let h be the total height (sea level altitude plus any structure on which the user is standing to make the observation) of the observation point 106 at the circle center C. Initially, for a given target tile 202, the height (h1) of target tile 202 is obtained. The visibly connected tiles for that target tile are then processed, such as a visibly connected tile 302. The straight-line surface distance d1 from the target tile 202 to the circle center C is then derived. Additionally, the distance d2 from the visibly connected tile 302 to the circle center C is derived.

If the distance d2 is less than the distance d1, the visibly connected tile 302 is skipped from further processing for this target tile 202. However, if the visibly connected tile 302 is farther away for the circle center C than the target tile 202, a shaded height analysis is performed. The shaded height is computed as $x=h-d_2/d_1(h-h1)$. The visibly connected tile 302 is marked (or tagged) as invisible if the shaded height x is greater than visible tile height (i.e., x>h2). This implies that the target tile 202 is greater in height than the visibly connected tile 302, and from the observation point 106, the user cannot see the visibly connected tile 302. Thus, this implementation finds all visible POIs within the visibility radius of the observation point 106.

Figure 4:
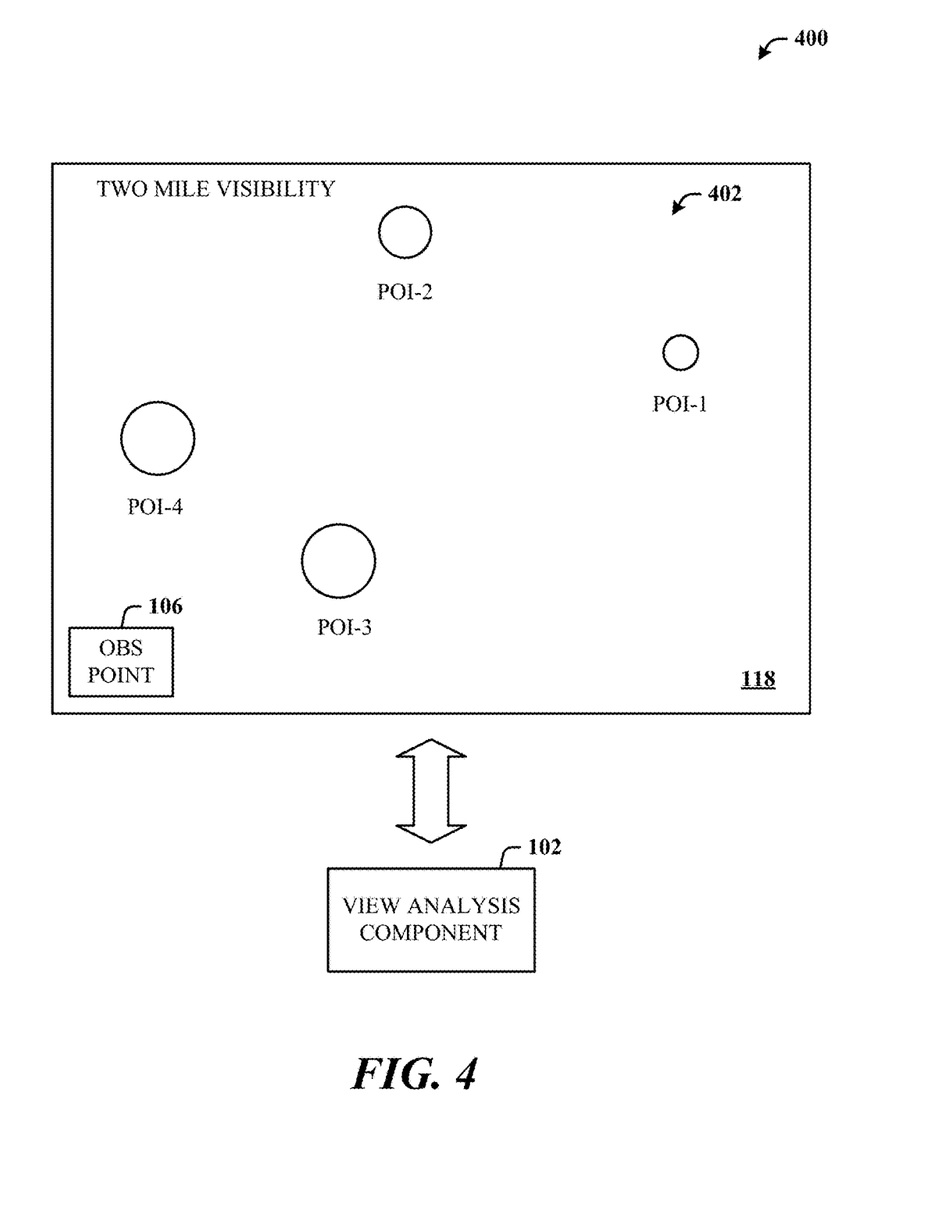
FIG. 4 illustrates an example 2D sight map system that presents the sight map as shown in a display of a device.

FIG. 4 illustrates an example 2D sight map system 400 that presents the sight map 118 as shown in a display of a device. In the example, the view analysis component 102 generates at least four POIs 402 within a visibility distance of no more than two miles (as also annotated in the sight map 118). The POIs 402 include a first POI-1, a second POI-2, a third POI-3, and a fourth POI-4. The sight map 118 can also show the observation point 106 relative to the POIs 402. The POIs 402 can be represented with graphical emphasis to indicate relative distance with respect to the observation point 106. Other types of emphasis include, but are not limited to, highlighting, interactive objects where if selected, show additional information about the environment condition(s) affecting visibility of the POI, thumbnail images presented by hover of a pointer over a POI graphic, etc.

Additionally, the POI annotation can be the actual name of the point of interest such as the "Space Needle". Thus, since the first POI-1 is the farthest away, it can be represented as the smallest graphic of the four POIs 402. The second POI-2 is closer than the first POI-1, yet more distant than the third POI-3 and fourth POI-4 from the observation point 106, thus, the second POI-2 can be larger than the first POI-1, but not as large as the third POI-3 and fourth POI-4. The third POI-3 and the fourth POI-4 can be the closest to the observation point 106 of the four POIs 402, and approximately equidistant from the observation point 106; hence, the third POI-3 and fourth POI-4 can be the same size, but larger than both the first POI-2 and second POI-2. Showing the observation point 106 on the sight map 118 also provides the relative heading of each of POI relative to the observation point 106, which is where the user is currently located.

It can be the case that only the four POIs 402 are shown based on the current level of zoom. If the user zooms out, additional POI within the two mile visibility radius may be shown.

The POIs 402 and visibility data can be computed and stored for given environmental conditions commonly occurring for a geographical area, since the structures of the area and elevations of many different observation points are known, as well as weather patterns, for example. Thus, a specific dataset for a given visibility condition, observation point, and POIs can be readily retrieved to the user device on demand. Alternatively, the sight map 118 can be computed in realtime as the environmental condition is occurring. In both cases, changes in the environmental conditions that affect visibility can cause automatic updating of the stored datasets and realtime presentation of the sight map.

Additionally, given the elevations and height information for structures and geographical points in the area it can be that only a partial view of a visible POI is available. This can be indicated to the user in a 3D rendering by showing a corresponding partial representation of the given POI, such as the top six floors of a building that would be visible for the visibility data and observation point. It can also be the case that visibility is limited to the lower portions of the POI due to a higher level view being blocked by the environmental condition(s). Thus, the 3D rendering shows only this visible lower portions of the structure.

It can also be an implementation where the user specifically requests whether a specific POI is visible ("From where I am, can I see the Space Needle today?"). Thus, the algorithm only computes the visibly connected tiles and target tiles for the specific POI. Thus, only a partial dataset need be retrieved from stored data, and/or realtime computation is limited to the specific POI, thus providing improved performance for processing and/or data retrieval.

In an alternative system implementation the visibility criteria are applied to a specific point POI or multiple POIs instead of the observation point. For example, if the visibility data is a two-mile radius about a specific POI, and the user location is determined to be within the two-mile radius, the user is notified that the POI can be viewed. In this implementation, the specific POI is input by the user and based on the visibility data at the POI, the sight map indicates whether the POI is visible from the observation point.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
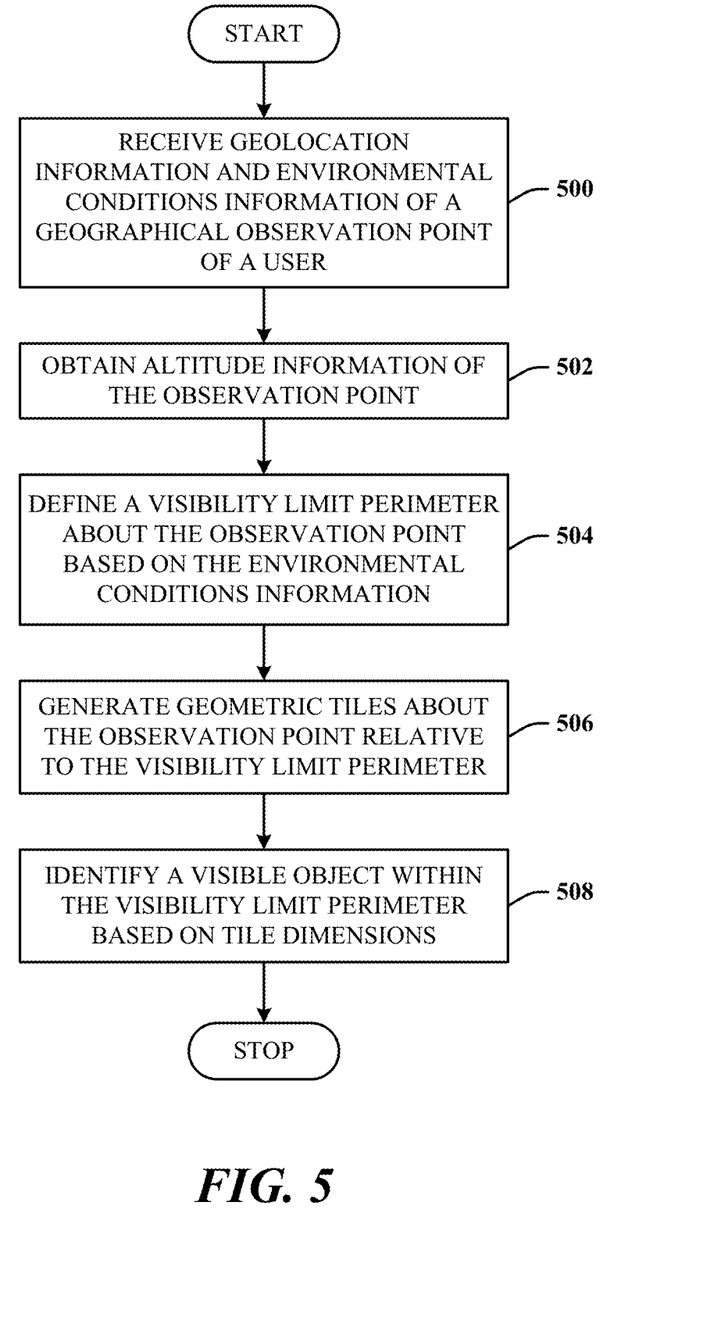
FIG. 5 illustrates a method in accordance with the disclosed architecture.

FIG. 5 illustrates a method in accordance with the disclosed architecture. At 500, geolocation information and environmental conditions information of a geographical observation point of a user are received. At 502, altitude information of the observation point is obtained. At 504, a visibility limit perimeter is defined about the observation point based on the environmental conditions information. At 506, geometric tiles are generated about the observation point relative to the visibility limit perimeter. At 508, a visible object is identified within the visibility limit perimeter based on tile dimensions.

The method can further comprise presenting the visible object on a geographical map to the user for viewing. The map can be a typical map that shows the streets and avenues, natural objects such as bodies of water, hills, mountains, etc. The method can further comprise identifying whether a specific point-of-interest queried by the user is visible from the observation point based on the environmental conditions information, which is weather visibly information. The method can further comprise identifying all visible objects within the visibility perimeter and presenting the visible objects to a user via a multi-dimensional sight map.

The method can further comprise configuring dimensions of the tiles according to footprint area. This can be accomplished automatically based on the geography of the area, structure density, etc. The method can further comprise configuring dimensions of the tile based on accuracy for a geographical area associated with the observation point. The method can further comprise computing the altitude information to include elevation of the observation point relative to sea level and height of a structure from which the user views the visible object.

Figure 6:
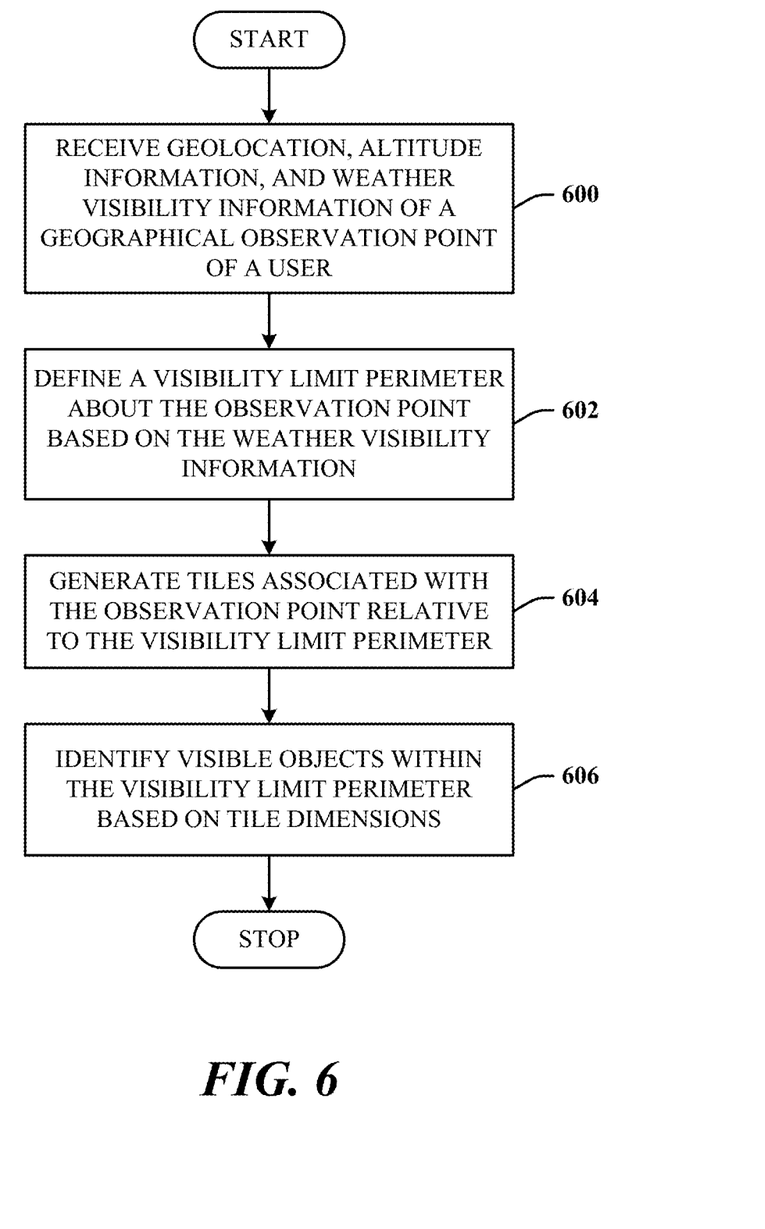
FIG. 6 illustrates an alternative method in accordance with the disclosed architecture.

FIG. 6 illustrates an alternative method in accordance with the disclosed architecture. The method can be realized on a computer-readable storage medium as computer-executable instructions that when executed by a microprocessor, cause the microprocessor to perform the following acts. At 600, geolocation information, altitude information, and weather visibility information of a geographical observation point of a user is received. At 602, a visibility limit perimeter is defined about the observation point based on the weather visibility information. At 604, tiles associated with the observation point are generated relative to the visibility limit perimeter. At 606, visible objects are identified within the visibility limit perimeter based on tile dimensions.

The method can further comprise presenting a multi-dimensional sight map that shows the user and the visible objects as commonly-known structures in the visibility limit perimeter. The method can further comprise processing the tiles to compute visibly connected tiles of a target tile currently being processed relative to the observation point.

The method can further comprise marking processed tiles to eliminate the processed tiles from further processing. The method can further comprise computing the altitude information to include elevation of the observation point relative to sea level and height of a structure from which the user views the visible object.

As used in this application, the terms "component" and "system" are intended to refer to a computer-related entity, either hardware, a combination of software and tangible hardware, software, or software in execution. For example, a component can be, but is not limited to, tangible components such as a microprocessor, chip memory, mass storage devices (e.g., optical drives, solid state drives, and/or magnetic storage media drives), and computers, and software components such as a process running on a microprocessor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
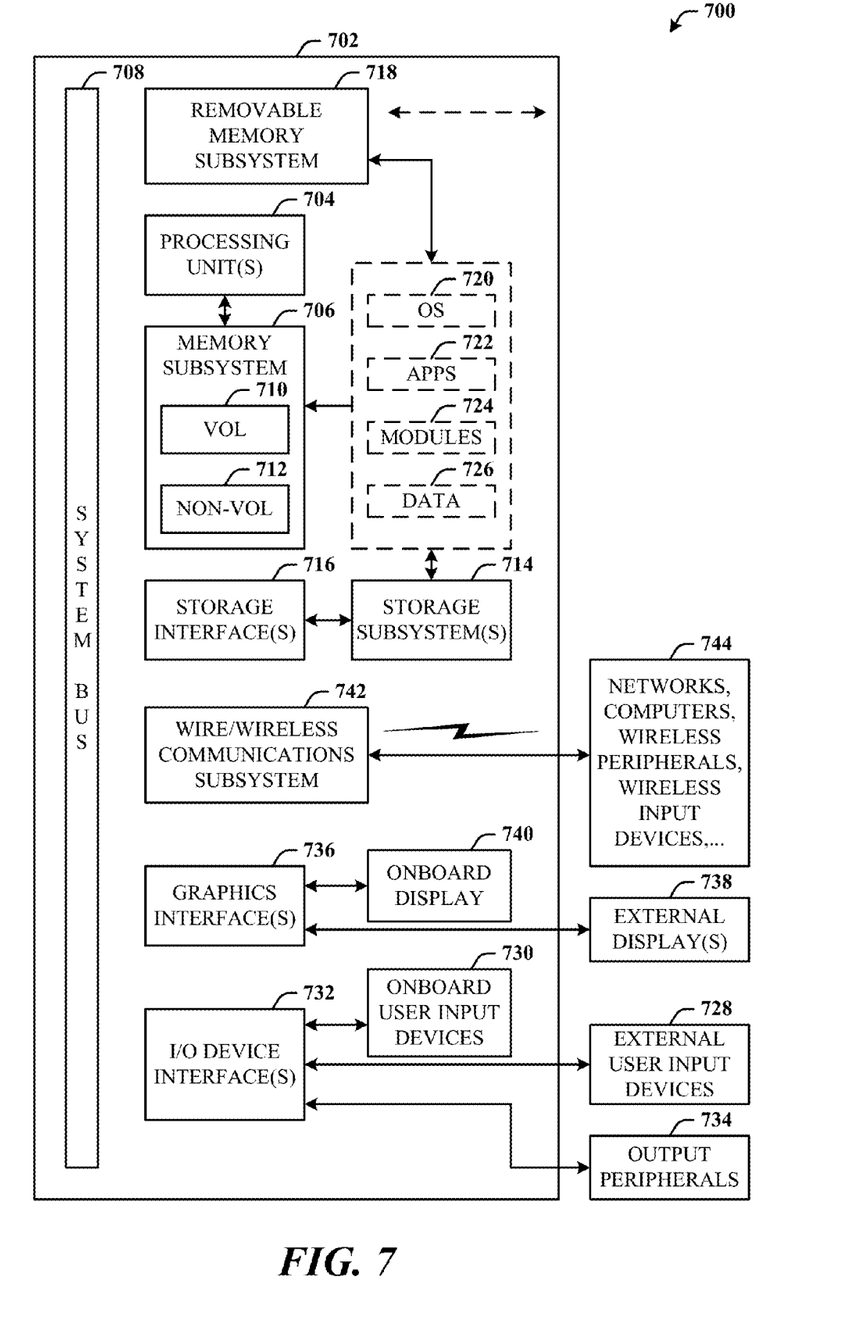
FIG. 7 illustrates a block diagram of a computing system that executes the visibility of a point of interest from an observation point based on environmental conditions in accordance with the disclosed architecture.

Referring now to FIG. 7, there is illustrated a block diagram of a computing system 700 that executes the visibility of a point of interest from an observation point based on environmental conditions in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 700 for implementing various aspects includes the computer 702 having microprocessing unit(s) 704 (also referred to as microprocessor(s) and processor(s)), a computer-readable storage medium such as a system memory 706 (computer readable storage medium/media also include magnetic disks, optical disks, solid state drives, external memory systems, and flash memory drives), and a system bus 708. The microprocessing unit(s) 704 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 702 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 706 can include computer-readable storage (physical storage) medium such as a volatile (VOL) memory 710 (e.g., random access memory (RAM)) and a non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the microprocessing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components and circuits. The storage subsystem(s) 714 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include items and components of the system 100 of FIG. 1, aspects the visibility perimeter, tiles and observation point of FIG. 2, computation aspects of FIG. 3, the system 400 of FIG. 4, and the methods represented by the flowcharts of FIGS. 5 and 6, for example.

Generally, programs include routines, methods, data structures, other software components, etc., that perform particular tasks, functions, or implement particular abstract data types. All or portions of the operating system 720, applications 722, modules 724, and/or data 726 can also be cached in memory such as the volatile memory 710 and/or non-volatile memory, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 702, and include volatile and non-volatile internal and/or external media that is removable and/or non-removable. For the computer 702, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 702, programs, and data using external user input devices 728 such as a keyboard and a mouse, as well as by voice commands facilitated by speech recognition. Other external user input devices 728 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 702, programs, and data using onboard user input devices 730 such a touchpad, microphone, keyboard, etc., where the computer 702 is a portable computer, for example.

These and other input devices are connected to the microprocessing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising a hardware processor and a memory device, the memory device configured to store computer-executable instructions that when executed by the hardware processor cause the hardware processor to implement one or more components comprising:
   a view analysis component configured to:
   identify an observation point by processing geographical location data associated with the observation point;
   identify a visibility distance relative to the observation point by processing environmental visibility data;
   generate a polygon around the observation point, the polygon including a visibility perimeter associated with the identified visibility distance, where the visibility perimeter defines a polygon area;
   apply a grid of tiles over the polygon area, where at least some of the tiles represent a point of interest (POI); and
   identify one or more points of interest that are visible from the observation point by processing each tile from the grid of tiles; and
   a presentation component configured to:
   generate a sight map that includes the observation point and the one or more identified points of interest that are visible from the observation point; and
   display the sight map in a user interface of a device.

2. The system of claim 1, wherein the view analysis component further processes contributions of structures associated with the grid of tiles in the polygon area.

3. The system of claim 2, wherein the view analysis component configures tile footprint dimensions based on accuracy and performance.

4. The system of claim 2, wherein the view analysis component processes tiles that intersect a target line for visibility, the target line drawn in association with the observation point and a target tile.

5. The system of claim 4, wherein the view analysis component computes tile heights of corresponding structures associated with the tiles along the target line.

6. The system of claim 1, wherein the environmental visibility data is weather visibility data derived from weather conditions information.

7. The system of claim 1, wherein processing each tile from the grid of tiles comprises at least tagging each tile from the grid of tiles that is identified as visible.

8. The system of claim 1, wherein the one or more identified points of interest included in the sight map include at least one of a graphical emphasis to indicate a relative distance with respect to the observation point and an annotation to indicate a name of the one or more identified points of interest.

9. A computer-implemented method, comprising computer-executable instructions that when executed by a hardware processor cause the hardware processor to perform a method for assessing visibility of one or more points of interest relative to an observation point, the method comprising:
   identifying an observation point by processing geographical location data associated with the observation point;
   identifying a visibility distance relative to the observation point by processing environmental visibility data;

generating a polygon around the observation point, the polygon including a visibility perimeter associated with the identified visibility distance, where the visibility perimeter defines a polygon area;

applying a grid of tiles over the polygon area, where at least some of the tiles represent a point of interest (POI);

identifying one or more points of interest that are visible from the observation point by processing each tile from the grid of tiles;

generating a sight map that includes the observation point and the one or more identified points of interest that are visible from the observation point; and displaying the sight map in a user interface of a device.

10. The computer-implemented method of claim 9, further comprising configuring dimensions of the tiles according to footprint area.

11. The computer-implemented method of claim 9, further comprising configuring dimensions of the tile based on accuracy for a geographical area associated with the observation point.

12. The computer-implemented method of claim 9, further comprising computing altitude information to include elevation of the observation point relative to sea level and height of a structure from which the user views the one or more identified points of interest.

13. The computer-implemented method of claim 9, further comprising storing the one or more identified points of interest that are visible from the observation point and the environmental visibility data.

14. The computer-implemented method of claim 13, further comprising when the environmental visibility data changes, automatically updating the one or more identified points of interest that are visible from the observation point and the environmental visibility data that is stored.

15. The computer-implemented method of claim 9, wherein at least one of the one or more identified points of interest included in the sight map includes a partial representation of the at least one identified point of interest.

16. A system comprising:
at least one processor; and
memory encoding computer executable instructions that, when executed by the at least one processor, perform a method for assessing visibility of an indicated point of interest relative to an observation point, the method comprising:

receiving a request from a user to determine whether a point of interest indicated in the request is visible relative to the observation point of the user;

identifying a visibility distance relative to the observation point by processing environmental visibility data;

generating a polygon around the observation point, the polygon including a visibility perimeter associated with the identified visibility distance, where the visibility perimeter defines a polygon area;

applying a grid of tiles over the polygon area;

selecting a target tile from the grid of tiles representative of the point of interest indicated in the request;

identifying visibly connected tiles for the target tile; and processing the target tile and the visibly connected tiles to determine whether the point of interest indicated in the request is visible relative to the observation point of the user.

17. The system of claim 16, wherein the visibly connected tiles intersect a target line that extends from the observation point through a center of the target tile and the visibility perimeter.

18. The system of claim 16, further comprising when it is determined that the point of interest indicated in the request is visible relative to the observation point:

generating a sight map that includes the observation point and the point of interest that is visible relative to the observation point; and displaying the sight map in a user interface of a device.

19. The system of claim 18, wherein the point of interest included in the sight map includes a graphical emphasis to indicate a relative distance with respect to the observation point.

20. The system of claim 18, wherein the point of interest included in the sight map includes an annotation to indicate a name of the point of interest.

* * * * *